United States Patent [19]

Harris

[11] Patent Number: 5,616,640
[45] Date of Patent: Apr. 1, 1997

[54] GOLF BALL COVER COMPOSITION CONTAINING OXA ACIDS

[75] Inventor: Kevin M. Harris, New Bedford, Mass.

[73] Assignees: Acushnet Company, Fairhaven, Mass.; E. I. Du Pont de Nemours & Co., Wilmington, Del.

[21] Appl. No.: 482,520

[22] Filed: Jun. 7, 1995

[51] Int. Cl.$^6$ .............................. A63B 37/12; C08K 5/09
[52] U.S. Cl. ........................ 473/378; 524/908; 524/290
[58] Field of Search .................................. 524/290, 908; 273/235 R

[56] References Cited

U.S. PATENT DOCUMENTS 5,306,760  4/1994  Sullivan .................................. 524/400

FOREIGN PATENT DOCUMENTS 276956  8/1988  European Pat. Off. .

*Primary Examiner*—Thomas Hamilton, III
*Attorney, Agent, or Firm*—Pennie & Edmonds

[57] ABSTRACT

A golf ball employing a cover composition comprising an oxa acid compound having the formula

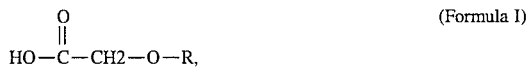

(Formula I)

wherein R is an organic moiety selected from the group consisting of alkyl, carbocyclic, and heterocyclic groups. Additionally, the present invention is directed towards a golf ball cover composition comprising a copolymer of at least two comonomers, the first comonomer comprising an oxa acid composition of Formula I, and the second comonomer is selected from the group consisting of polyurethanes, epoxy resins, polyethylenes, polyamides, polyesters, and a monomer having a carboxylic acid moiety or its corresponding ionomer. Golf balls employing the present cover compositions exhibit excellent spin characteristics as well as good shear resistance.

14 Claims, No Drawings

GOLF BALL COVER COMPOSITION CONTAINING OXA ACIDS

FIELD OF INVENTION

This invention relates generally to golf balls, and more specifically, to golf ball cover composition. In particular, the invention relates to golf ball cover compositions comprising oxa acids. Golf balls made with the cover compositions of the present invention have been found to have good shear resistance and excellent spin rates.

BACKGROUND OF THE INVENTION

Throughout its history, the golf ball has undergone an extensive evolution in an effort to improve its play-related characteristics such as durability, distance, and control. The first golf balls appeared around the 14th century and consisted of a leather sack which had been soaked in water and subsequently filled with wet feathers. As the sack dried, the leather would contract and the feathers expanded, resulting in a very hard mass which was then hammered into a round ball. These "feathery" golf balls were in use until about the mid 19th century, when a single piece golf ball made from "gutta percha" was introduced. Gutta percha is a rubber like material which is made from a type of tree sap, and at the time was primarily used as a packing material. The gutta percha balls were found to be more durable than the feathery balls, but did not offer the same distance of the older balls.

After the introduction of the gutta percha balls, it was discovered that a ball's flight was notably longer and more accurate after the surface had been nicked and scratched during use. Accordingly, golf ball manufacturers developed a number of methods for providing balls with a gutta percha cover that had a variety of patterns of nicks or markings on the surface. This eventually lead to the complex dimple patterns which are in use on golf balls today.

In the early 1900's, the wound rubber ball was introduced, which was considered a major breakthrough in the design of golf balls. It consisted of a ball in which a rubber thread was tightly wound around a solid rubber core and that wound core was encased in a gutta percha cover. The early wound rubber balls lacked uniformity in size and weight, but the ball had a livelier core and the golfer was better able to control the spin of the ball.

Modern day golf balls can be classified as one-piece, two-piece, and three-piece (also known as "wound"). One-piece balls are molded from a homogeneous mass of material with a dimple pattern molded therein. These are inexpensive and very durable, but do not provide great distance because of their relatively high spin rate and low velocity. Two-piece balls are made by molding a cover about a solid core. These are the most popular types of balls in use today. These balls typically have a hard "cutproof" cover which gives in a high distance ball, but has lower spin rates resulting in a decreased ability to control the ball. Three-piece or wound balls are made by molding a cover about a wound core. The core is typically made of rubber and can be solid, semi-solid or have a liquid center. A wound core is prepared by winding a lengthy thin thread of elastic material about the center core. The wound core is then covered with a durable cover material. Wound balls are generally softer and provide more spin, resulting in increased control over the ball, but typically a shorter distance than a two piece ball. As a result of their more complex construction, the wound balls generally require a longer time to manufacture and are more expensive to produce than two-piece balls.

The covers of today's golf balls are made from any number of materials such as Balata, SURLYN, IOTEK and polyurethane. Balata is a type of natural rubber and is one of the softest cover types. For many years, balata was the standard cover stock material for most golf balls. Balata covered balls are favored among professionals and more advanced amateur players because the softness of the cover allows the player to achieve spin rates sufficient to more precisely control ball direction and distance, particularly on shorter approach shots.

However, Balata covered balls are expensive and less durable as compared to the other covering materials. In particular, balata covered balls are susceptible to nicks or cuts as a result of a poorly swung golf club, which is not uncommon with the average recreational golfer. Such nicks or cuts detract from the flight characteristics of the ball, rendering them of little use. Accordingly, cover compositions have been developed in an attempt to provide spin rates and a feel approaching those of balata covered balls while also providing a golf ball with a higher durability and overall distance.

In the middle 1960's, E. I. DuPont de Nemours and Co. discovered a new species of resins known as ionomer resins. These resins are sold under the trademark SURLYN™ and, to a large extent, have replaced balata as a cover stock material. Chemically, these ionomer resins are a copolymer of an olefin and an alpha, beta ethylenically unsaturated carboxylic acid with 10–90% of the carboxylic acid groups being neutralized by a metal ion. See U.S. Pat. No. 3,264,272. Today, the only commercially available ionomer resins are copolymers of ethylene and methacrylic or acrylic acid. These ionomer resins are distinguished by the type of metal ion, the amount of acid, and the degree of neutralization.

Dunlop Rubber Company obtained the first patent on the use of Surlyn for the cover of a golf ball, see U.S. Pat. No. 3,454,280 issued Jul. 8, 1969. Since then, there have been a number of disclosures on the use of these ionomer resins in the cover composition of a golf ball. See, for example, U.S. Pat. Nos. 3,819,768 issued Jun. 25, 1974; 4,323,247 issued Apr. 6, 1982; 4,526,375 issued Jul. 2, 1985; 4,884,814 issued Dec. 3, 1989; and 4,911,451 issued Mar. 27, 1990. However, while these golf balls possess virtually cutproof covers, they have inferior spin and feel properties as compared to balata covered balls.

In November 1986 DuPont introduced a sodium and zinc ionomer resin having a low flexural modulus and suggested using and blending the same with other ionomer resins for making a golf ball cover. Golf ball covers made from these low flexural modulus ionomer resins have improved spin and feel characteristics, but relatively low velocity.

In December of 1986, DuPont introduced a lithium ionomer resin which was a copolymer of ethylene and methacrylic acid. These lithium ionomer resins have a very high flexural modulus, typically about 60,000 psi (415 MPa). DuPont suggested that lithium ionomer resins could be used to produce a golf ball cover which would be more cut resistant and harder than a cover made with either sodium or zinc ionomer resins. DuPont also suggested that a golf ball having a cover made from a lithium ionomer resin would go farther, have a higher coefficient of restitution and be less prone to cutting (i.e., more durable) than a golf ball made from other known ionomer resins such as sodium and zinc ionomer resins and blends thereof. DuPont further suggested that lithium ionomer resins could be used in blends with other ionomer resins where they can impart better cut resistance to those other resins.

The United States Golf Association (USGA) has promulgated a rule that no golf ball shall have an initial velocity that exceeds 255 feet (78 m) per second, i.e., 250 feet (76 m) per second with a 2% tolerance. Golf balls with covers made from ionomer resins with low flexural modulus are substantially below this maximum and, as should be appreciated, all golf ball manufacturers strive to come as close as possible to this limit.

In order to approximate the characteristics of balata covered balls at a lower cost, the art has developed balls of a variety of cover compositions. As noted above, these prior art compositions have a considerably higher cut resistance and durability as compared to balata covered balls. However, despite numerous attempts to replicate the performance of balata covered balls, the golf ball cover compositions of the prior art generally suffer from low spin rates which makes them difficult to control near the greens. Further, the prior art balls tend to have relatively poor "click and feel" as compared to the balata covered balls. Additionally, many of the prior art golf ball cover compositions are low flexural modulus ionomer resins which have improved spin and feel characteristics, but relatively low velocity, which results in shorter overall distance.

Consequently, a need exists for a golf ball composition cover which provides spin rates and a feel more closely approximating those of balata covered balls while also providing a high degree of durability than that provided by the balls presently available or disclosed in the prior art.

SUMMARY OF THE INVENTION

The present invention is directed towards an improved golf ball cover material composition capable of providing good shear resistance and durability as well as excellent spin rates.

The present invention is further directed towards the novel use of oxa acids in golf ball cover compositions.

The present invention is still further directed to a golf ball comprising a cover and a core wherein the cover comprises an oxa acid compound having the formula:

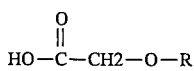

wherein R is an organic moiety selected from the group consisting of a linear or branch chained alkyl, a substituted or unsubstituted carbocyclic or heterocyclic groups.

Additionally, the present invention is also directed to a golf ball comprising a cover and a core wherein the cover composition comprises a copolymer of at least two comonomers. The first comonomer has the formula:

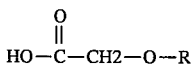

wherein R is an organic moiety selected from the group consisting of alkyl, carbocyclic, and heterocyclic groups. The second comonomer is selected from the group consisting of polyurethanes, epoxy resins, polyethylenes, polyamides, polyesters, and a monomer having a carboxylic acid moiety or its corresponding ionomer.

Having briefly summarized the invention, the invention will be described in detail by reference to the following specification and non-limiting examples.

DETAILED DESCRIPTION OF THE INVENTION

As used herein, the following terms are defined as related below.

As used herein, the term "oxa acid" means compound having the formula:

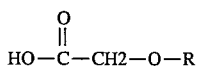

wherein R is an organic moiety selected from the group consisting of alkyl, carbocyclic, and heterocyclic groups.

As used herein, "alkyl groups" means any substituted or unsubstituted acyclic carbon-containing compounds, including alkanes, alkenes and alkynes. Examples of alkyl groups include lower alkyl, for example, methyl, ethyl, n-propyl, iso-propyl, n-butyl, iso-butyl or tert-butyl; upper alkyl, for example, octyl, nonyl, decyl, and the like; and lower alkylene, for example, ethylene, propylene, propyldiene, butylene, butadiene, and the like. The ordinary skilled artisan is familiar with numerous linear and branched alkyl groups, which are within the scope of the present invention. In addition, such alkyl group may also contain various substituents in which one or more hydrogen atoms has been replaced by a functional group. Functional groups include but are not limited to hydroxyl, amino, carboxyl, amide, ester, ether, and halogen (fluorine, chlorine, bromine and iodine).

As used herein, "carbocyclic groups" means cyclic carbon-containing compounds, including but not limited to cyclopentyl, cyclohexyl, cycloheptyl, adamantyl, and the like. Such cyclic groups may also contain various substituents in which one or more hydrogen atoms has been replaced by a functional group. Such functional groups include those described above, and lower alkyl groups as described above.

As used herein, "heterocyclic groups" means closed cyclic carbon-containing compounds wherein one or more of the atoms in the ring is an element other than carbon, e.g. sulfur, nitrogen, etc., including but not limited to pyridine, pyrole, furan, thiophene, and purine.

As used herein, the term "polymer" means any type of polymer including random polymers, block polymers, etc.

This invention is particularly directed towards golf ball having covers comprising oxa acid compounds of the formula:

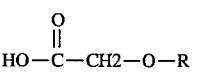
Formula I wherein R is an organic moiety selected from the group consisting of alkyl, carbocyclic, and heterocyclic groups.

Furthermore, the invention is directed towards oxa acid compounds of formula I, wherein R has the formula:

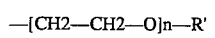
Formula II wherein R' is an organic moiety selected from the group consisting of alkyl, carbocyclic, and heterocyclic groups and n is an integer greater than 1. In particular, n is an integer from 1 to 27.

Any number of oxa acid compounds of Formula I are contemplated as being useful in the present invention. Some specific oxa acids useful in the novel golf ball compositions of the present invention include 3,6-dioxaheptanoic acid having the formula:

3,6-Dioxaheptanoic acid

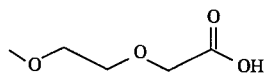

3,6,9 trioxadecanoic acid, having the formula:

3.6.9-Trioxadecanoic acid

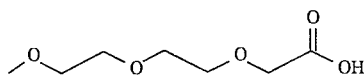

3,6,9-trioxaundecanedioic acid, having the formula:

3.6.9-Trioxaundecanedioic acid

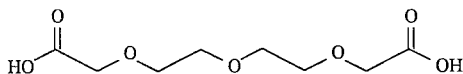

and Polyglycol diacid, having the formula:

Polyglycol diacid (n = 10–12)

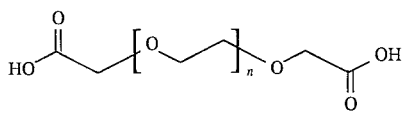

These oxa acid compositions possess a variety of properties which make them useful in the present golf ball cover compositions. These properties include wide liquid ranges due to their low melting and high boiling points, high viscosity, good heat stability, solubility in media of widely differing polarity, development of surface-active properties, and good complexing properties for metal ions. Among other functions, these oxa acid compositions are useful as comonomers in a number of resin compositions for positively influencing a variety of properties. Admixing oxa acids as a comonomer with polyesters, polyamides, polyurethanes and epoxy resins influences properties such as elasticity to avoid or eliminate cracking, viscosity and thixotropy, heat and light resistance, dyeability, static charging, mechanical resistance, wettability, initiation of polymerization, and molecular weight.

This invention is further directed to a golf ball comprising a cover and a core wherein said cover comprises a copolymer of at least two comonomers and the first comonomer has the formula:

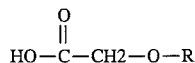

wherein R is an organic moiety selected from the group consisting of alkyl, carbocyclic, and heterocyclic groups and the second comonomer is selected from the group consisting of polyurethanes, epoxy resins, polyethylenes, polyamides, polyesters, and a monomer having a carboxylic acid moiety or its corresponding ionomer.

It is known in the art that these second comonomers impart a variety of properties upon golf ball compositions. Accordingly, an appropriate comonomer is selected depending upon its effect upon the desired properties of the cover composition.

A variety of comonomers having a carboxylic acid moiety useful in the present invention are commercially available, including SURLYN® (DuPont), ESOCOR®, NUCREL or IOTEK (Exxon).

The preferred comonomers are those having a carboxylic acid ionomer moiety, such as those available from DuPont under the tradename SURLYN®. These ionomer resins are currently available in more than fifty commercial grades, varying in composition depending on the metal ion, the amount of acid, and degree of neutralization. The different grades of material impart a variety of characteristics of cover compositions in which they are employed. Any number of these ionomers resins available from DuPont may be employed in the present invention, depending upon the desired cover composition characteristics.

A variety of SURLYNS are available which are classified according to the metal ions (e.g. sodium, potassium, zinc, calcium, lithium, and magnesium) employed to neutralize the carboxylic acids of the ionomers. For example, lithium ionomer resins such as those sold under the trade name SURLYN 8118, 7930 and 7940 by DuPont can be employed in the invention. Likewise, sodium ionomer resins such as those sold by DuPont under the name SURLYN 8269, 8265, 8320, 8120 and 8660 also may be employed in the present invention.

SURLYN 8118, 7930 and 7940 have flexural moduli of 61,000, 67,000 psi and 61,000 psi respectively. SURLYN 8269 and 8320 each have a flexural modulus of 2,800 psi. SURLYN 8265 and 8120 have a flexural modulus of 7,100 psi. SURLYN 8660 has a flexural modulus of 34,000 psi.

SURLYN 8118, 7930 and 7940 have melt flow indexes of about 1.4, 1.8 and 2.6 g/10 min., respectively. SURLYN 8269, 8320, 8265, and 8120 each have a melt flow index of about 0.9 g/10 min. SURLYN 8660 has a melt flow index of 10 gm/10 min. Melt flow index is measured in accordance with A.S.T.M. Test D 1238, condition E, procedure A.

Similarly, ionomers such as SURLYNS can be classified as low acid depending upon their acid content. Some examples of high acid SURLYNS include SURLYN 8220, SURLYN 8240 and SURLYN 9220. All of these ionomers contain from about 15% by weight methacrylic acid. SURLYN AD-8422 is currently available in a number of different grades (i.e. AD-8422-2, AD-8422-3, AD-8422-5, etc.) based upon differences in melt index.

In contrast, SURLYN 8920 (sodium), SURLYN 9910 (Zinc), and SURLYN 8940 (sodium) are all examples of low acid SURLYNS which have 15% or less methacrylic acid. In comparing the properties of low acid SURLYNS with high acid SURLYNS, it is generally known that the high acid SURLYNS have a higher tensile yield, lower elongation, slightly higher Shore D hardness and a much higher flexural modulus.

A preferred ionomer resin useful in the present cover compositions is a lithium ionomer resin sold under the trade name SURLYN 7930. As noted above, SURLYN 7930 has a flexural modulus of 67,000 and a melt flow index of about 1.8, as measured in accordance with A.S.T.M. Test D 1238, condition E, procedure A.

Examples of other preferred ionomers include SURLYN 7930, 7940, 8920, 9910 and 8940.

Further, this invention contemplates employing a blend of one or more oxa acid compounds of Formula I with one or more comonomers. Any comonomer which is compatible with the oxa acid compounds of formula I may be used in the golf ball compositions according to the present invention. These comonomers may include for example polyurethanes, epoxy resins, polyethylenes, polyamides, polyesters, and monomers having a carboxylic acid moiety or its corresponding ionomer may be employed in a blend of two or more of these comonomers with an oxa acid comonomer of Formula I to achieve a cover composition possessing desired properties.

The present invention provides a golf ball cover composition that comprises up to 100 parts per weight resin (phr) of a comonomer comprising an oxa acid composition of Formula I. Any amount including ranges of up to 0.1 parts, 0.5 parts to 15 parts by 0.5 parts intervals, 20 parts, 25 parts, 35 parts, 45 parts, 55 parts, 75 parts and 90 parts per hundred of resin may be used according to the present invention.

One embodiment of the present invention is a golf ball cover composition comprising a blend comprising about 1 to 35 parts by weight based on 100 parts per weight resin (phr) of a comonomer comprising an oxa acid composition of Formula I and about 99 to 1 phr of a comonomer selected from the group consisting of polyurethanes, epoxy resins, polyethylenes, polyamides, polyesters, and a monomer having a carboxylic acid moiety or its corresponding ionomer. According to a more preferred mode of the present invention a golf ball cover composition comprises a blend comprising about 1 to 50 parts by weight based on 100 parts per weight resin (phr) of a comonomer comprising an oxa acid composition of Formula I and about 50 to 1 phr of a comonomer compatible ith the oxa acid compounds according to the present invention.

A more preferred embodiment of the present invention is a golf ball cover composition comprising a blend comprising about 1 to 25 phr of a comonomer comprising an oxa acid composition of Formula I and about 75 to 1 phr of a comonomer selected from the group consisting of ionomers, polyurethanes, epoxy resins, polyethylenes, polyamides, polyesters, and a monomer having a carboxylic acid or ester moiety.

A most preferred embodiment of the present invention is a golf ball cover composition comprising a blend comprising about 1-15 phr of a comonomer comprising an oxa acid composition of Formula I and about 15-25 phr of a comonomer selected from the group consisting of polyurethanes, epoxy resins, polyethylenes, polyamides, polyesters, and monomers having a carboxylic acid or ester moiety.

The present cover compositions can be used in golf balls of any size. Although the United States Golf Association (USGA) specifications limit the minimum size of a competition golf ball to more than 1.680 inches in diameter, golf balls of any size can be used for recreational play. The preferred diameter of the golf balls is from about 1.680 inches to about 1.800 inches. The more preferred diameter is from about 1.680 inches to about 1.760 inches. A diameter from about 1.680 inches to about 1.740 inches is most preferred. Oversized golf balls above about 1.760 inches to game balls as big as softballs are also contemplated by the present invention.

Likewise, the present cover compositions can be used in any type of golf ball. In particular, the present cover compositions can be used in two-piece golf balls wherein a cover surrounds a core material. Further, the present cover compositions are also useful in three-piece or wound golf balls, in which a liquid, semi-solid or solid core is surrounded by a winding of an elastic material and the wound core is then covered with a cover composition. Typically, golf ball have a cover with a thickness of about 0.04 inches to about 0.10 inches.

Golf balls which employ cover materials comprising the subject compounds of the present invention are made in a conventional manner by molding the cover stock material around a core. The present compounds can be employed alone, or in a blend with other materials such as ionomer resins. Further, the cover stock material may include a variety of additional compounds such as polybutadiene, polyurethane, and polyisoprene; whitening agents such as titanium dioxide; dyes; UV absorbers; optical brighteners; and other additives which are conventionally included in golf ball covers.

The present compounds may be blended using any conventional blending technique. For example, the present compounds may be added to a vessel containing pelletized ionomer resins and heated to 300° F.–500° F. Thorough mixing of the materials is accomplished by means of a screw in the heated vessel. Typically, the covers are formed around the solid or wound cores by either compression molding preformed half-shells of the cover stock material or by injection molding the cover stock about the core. The preferred method is compression molding of preformed half-shells.

In compression molding, the half-shells of the stock material are made by injection molding the cover stock material into a conventional half-shell mold at 300° F.–500° F. The preformed half-shells are placed around a core to provide an assembly which is introduced into a conventional compression molding machinery such as that shown in U.S. Pat. No. 4,508,309. The ball is allowed to cool in the mold until the cover is hard enough to be handled without deforming. The balls then undergo conventional finishing operations such as buffing, painting and stamping. This type of cover construction is generally referred to as a two-piece cover.

Alternatively, golf balls can be covered solely by an injection molding technique. In injection molding, an injection molding machine is utilized in which the core assembly is placed in a mold cavity. The core assembly is held in place through the use of several retractable pins. Such injection molding machines are well known in the art. The molten cover material is injected into the cavity surrounding the core. As the cover material cools and hardens, the pins retract and the molded ball is ejected from the mold. The balls then undergo conventional finishing operations such as buffing, painting and stamping. This type of cover construction is generally referred to as a one-piece cover.

Numerous oxa acid compounds useful in the cover compositions of the present invention are available from Hoechst Celanese Corporation, Fine Chemicals Division under the trade name "Oxa Acids." See Hoechst Celanese Corporation's "Oxa Acids" Brochure (1994).

Additionally, the oxa acid compounds can be synthesized by a variety of synthetic routes known to the skilled organic chemist. It is well known in the art of organic synthesis that many different synthetic protocols can be used to prepare a given compound. Different routes can involve more or less expensive reagents, easier or more difficult separation or purification procedures, straightforward or cumbersome scale-up, and higher or lower yield. The skilled synthetic organic chemist knows well how to balance the competing characteristics of synthetic strategies. Thus the compounds of the present invention are not limited by the choice of synthetic strategy, and any synthetic strategy that yields the compounds described above can be used.

The following examples are given to illustrate the novel golf ball cover compositions of the present invention. It is to be understood, however, that the invention is not limited thereto.

In order to exemplify the effects of oxa-acid compounds blended with other golf ball cover materials, an amount of oxa acid compound was mixed with SURLYN 7930 in a twin screw extruder. The exact amount of each component of the blend, the flexural modulus and the Shore-D Hardness are set forth in Table I below.

TABLE I

| % Surlyn 7930/ % Oxa Acid | Flex Modulus (KSI) | Shore-D Hardness |
|---|---|---|
| 100% Surlyn 7930 | 67 | 68 |
| 96.7% Surlyn 7930 3.6% 3,6,9, Trioxadecanoic Acid | 49.3 | 67.2 |
| 93.4% Surlyn 7930 6.6% 3,6,9, Trioxadecanoic Acid | 13.9 | 55.2 |
| 96.7% Surlyn 7930 3.3% 3,6 Dioxaheptanoic Acid | 47.4 | 67.3 |
| 93.4% Surlyn 7930 6.6% 3,6 Dioxaheptanoic Acid | 12.1 | 54.2 |

Shore D Hardness was measured using an apparatus known as a Shore-D Meter 2000 and a Automatic Stand Model 902. The meter is turned on and allowed to stabilize for 5 minutes. The meter was then calibrated with a rectangular metal standard to read 99.9. The testing time was set at one second as per ASTM D2240. Three flex bars were measured six times and averaged to get the value reported in Table I.

Flexural modulus was then measured by determining the dimensions of the bars using well known computer calculations and then using ASTM Method D790. Five bars were tested and averaged to provide the final value appearing in Table I. The test speed was 0.2 in/min. The flex bars detailed above were allowed to condition for 48 hours prior to testing.

As can be seen from the examples and results in Table I, oxa acids employed in golf ball cover blends according to the present invention can be used to lower the flexural modulus of golf ball covers.

I claim:

1. A golf ball comprising a cover and a core wherein said cover is formed from a blend which comprises a compound having the formula:

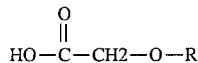

wherein R is an organic moiety selected from the group consisting of alkyl, carbocyclic, and heterocyclic groups.

2. A golf ball according to claim 1 wherein R has the formula:

wherein R' is an organic moiety selected from the group consisting of alkyl, carbocyclic, and heterocyclic groups and n is an integer greater than 1.

3. A golf ball according to claim 2, wherein R' has the formula:

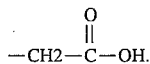

4. A golf ball according to claim 3, wherein n is an integer between 1 and 27.
5. A golf ball according to claim 4 wherein n is 1.
6. A golf ball according to claim 4 wherein n is 2.
7. A golf ball according to claim 4 wherein n is 3.
8. A golf ball according to claim 4, wherein n is 4.
9. A golf ball according to claim 2 wherein R' is a methyl group.
10. A golf ball according to claim 9 wherein n is an integer between 1 and 27.
11. A golf ball according to claim 10 wherein n is 1.
12. A golf ball according to claim 10 wherein n is 2.
13. A golf ball according to claim 10 wherein n is 3.
14. A golf ball according to claim 10 wherein n is 4.

* * * * *

UNITED STATES PATENT AND TRADEMARK OFFICE
CERTIFICATE OF CORRECTION

PATENT NO. : 5,616,640

DATED : April 1, 1997

INVENTOR(S) :
K. Harris

It is certified that error appears in the above-indentified patent and that said Letters Patent is hereby corrected as shown below:

The caption should read as follows:

Harris et al.

The cover page should read as follows:

[75] Inventors: Kevin M. Harris, New Bedford, Mass.;
Murali Rajagopalan, South Dartmouth, Mass.; and
Robert J. Statz, Kennett Square, Pa.

Signed and Sealed this

Twenty-fourth Day of June, 1997

Attest:

Attesting Officer

BRUCE LEHMAN

Commissioner of Patents and Trademarks